United States Patent
Maurer et al.

(10) Patent No.: US 11,702,156 B2
(45) Date of Patent: Jul. 18, 2023

(54) DRIVING WHEEL AND DRIVING SYSTEM FOR A TRACKED VEHICLE

(71) Applicant: PRINOTH S.P.A., Vipiteno (IT)

(72) Inventors: Gregor Maurer, Vipiteno (IT); Martin Franz, Vipiteno (IT)

(73) Assignee: PRINOTH S.P.A., Vipiteno (IT)

( * ) Notice: Subject to any disclaimer, the term of this patent is extended or adjusted under 35 U.S.C. 154(b) by 629 days.

(21) Appl. No.: 16/615,342

(22) PCT Filed: May 18, 2018

(86) PCT No.: PCT/IB2018/053507
§ 371 (c)(1),
(2) Date: Nov. 20, 2019

(87) PCT Pub. No.: WO2018/215895
PCT Pub. Date: Nov. 29, 2018

(65) Prior Publication Data
US 2020/0216124 A1 Jul. 9, 2020

(30) Foreign Application Priority Data
May 23, 2017 (IT) .......................... 102017000055909

(51) Int. Cl.
*B62D 55/125* (2006.01)
*B62D 55/06* (2006.01)
(Continued)

(52) U.S. Cl.
CPC ........... *B62D 55/125* (2013.01); *B62D 55/06* (2013.01); *B62D 55/253* (2013.01); *B62D 55/286* (2013.01); *E01H 4/02* (2013.01)

(58) Field of Classification Search
CPC .......... E01H 4/02; B62D 55/24; B62D 55/26; B62D 55/12; B62D 55/286; B62D 55/06;
(Continued)

(56) References Cited

U.S. PATENT DOCUMENTS

| 1,443,787 A | * | 1/1923 | French | B62D 55/10 |
| | | | | 305/140 |
| 2,953,930 A | * | 9/1960 | Meyer | F16H 7/06 |
| | | | | 474/148 |

(Continued)

FOREIGN PATENT DOCUMENTS

| CN | 101513901 | 8/2009 |
| DE | 10320523 | 11/2004 |

(Continued)

OTHER PUBLICATIONS

Office Action and Search Report for Chinese Application No. 201810499777.5 dated Jul. 23, 2021 (8 pages).
(Continued)

*Primary Examiner* — Anne Marie M Boehler
(74) *Attorney, Agent, or Firm* — Neal, Gerber & Eisenberg LLP

(57) ABSTRACT

A driving system for a tracked vehicle, in particular a tracked vehicle used for the preparation of ski slopes, features a driving wheel rotatable about a first axis of rotation; an idle wheel rotatable about a second axis of rotation parallel to the first axis of rotation; and a track looped around the driving wheel and the idle wheel, and comprising a plurality of strips made of elastomeric material, and a plurality of metal grousers, fixed to the strips; wherein at least one strip has at least one continuous toothed strip, which extends along the inner face of the strip and is configured to engage with the driving wheel.

21 Claims, 6 Drawing Sheets

(51) Int. Cl.
  *B62D 55/253* (2006.01)
  *B62D 55/28* (2006.01)
  *E01H 4/02* (2006.01)
(58) Field of Classification Search
  CPC .... B62D 55/125; B62D 55/13; B62D 55/135; B62D 55/253; F16H 2055/306; F16H 55/30; F16H 55/303; F16H 2007/185; F16H 7/18
  USPC .......................................... 180/9.62; 301/116
  See application file for complete search history.

(56) References Cited

U.S. PATENT DOCUMENTS

| | | | | |
|---|---|---|---|---|
| 3,057,219 | A * | 10/1962 | Montgomery | F16H 7/06 474/901 |
| 4,227,422 | A * | 10/1980 | Kawashima | F16H 7/06 198/834 |
| 4,241,956 | A * | 12/1980 | Meisel, Jr. | B62D 55/24 305/109 |
| 5,161,867 | A | 11/1992 | Johnson | |
| 5,224,903 | A * | 7/1993 | Langhof | B62M 9/08 474/152 |
| 6,123,399 | A | 9/2000 | Snyder | |
| 6,508,524 | B2 * | 1/2003 | Rutz | F16H 55/30 305/195 |
| 7,914,408 | B2 * | 3/2011 | Young | F16H 7/06 474/152 |
| 2003/0176251 | A1 * | 9/2003 | Hamilton | F16H 55/30 474/161 |
| 2013/0138304 | A1 * | 5/2013 | Wagger | B62D 55/00 701/50 |
| 2015/0344087 | A1 * | 12/2015 | de Boe | B62D 55/14 305/142 |
| 2016/0052570 | A1 * | 2/2016 | Ellmann | B62D 55/211 305/142 |

FOREIGN PATENT DOCUMENTS

| | | |
|---|---|---|
| EP | 2285651 | 2/2011 |
| JP | 2015151036 | 8/2015 |
| SU | 184919 A1 | 7/1966 |
| SU | 520287 A1 | 7/1976 |
| SU | 1668200 A1 | 8/1991 |
| WO | WO 2015/132741 | 9/2015 |

OTHER PUBLICATIONS

Office Action and Search Report (with translation) for Russian Application No. 2019137449/11 dated Apr. 26, 2021 (13 pages).
Notification Concerning Submission, Obtention or Transmittal of Priority Document for International Application No. PCT/IB2018/053507 dated Jul. 11, 2018.
International Search Report and Written Opinion for International Application No. PCT/IB2018/053507 dated Aug. 21, 2018.

* cited by examiner

DRIVING WHEEL AND DRIVING SYSTEM FOR A TRACKED VEHICLE

PRIORITY CLAIM

This application is a national stage application of PCT/IB2018/053507, filed on May 18, 2018, which claims the benefit of and priority to Italian Patent Application No. 102017000055909, filed on May 23, 2017, the entire contents of which are each incorporated by reference herein.

TECHNICAL FIELD

The present disclosure relates to a driving wheel of a tracked vehicle, in particular a tracked snow groomer.

BACKGROUND OF THE DISCLOSURE

Generally, a driving wheel of a tracked snow groomer is part of a driving system, which, in addition to the aforementioned driving wheel, comprises an idle wheel; and a track, which is looped around the driving wheel and the idle wheel. The track comprises a plurality of belts made of elastomeric material and a plurality of cross-links fixed to the belts and distributed along the track. The driving wheel is provided with radial lobes that engage with the cross-links between the belts. A driving system of the above type is described in German Patent Application No. DE 103 20 523 A1 and has the drawback that the track is returned along a polygonal path that generates vibrations on board the vehicle.

In accordance with an alternative embodiment described in European Patent Application No. EP 2,285,651, the driving system comprises a chain connected to the cross members, and the driving wheel is configured to engage with the chain.

Driving systems for tracked vehicles of the type identified above provide a secure grip without slippage between the driving wheel and the track, but in particular for relatively high speeds, generate vibrations to the detriment of comfort and wear of the driving system components.

In order to avoid the problem highlighted above, the applicant proposed a technical solution that is described in PCT Patent Application No. WO 2015/132741 and features a driving wheel, which is configured to engage with a toothed belt, which is fixed to the cross-links and is made of elastomeric material.

This technical solution, compared to the previously described technical solutions, is able to absorb shocks and reduce the vibrations of the vehicle, but requires a toothed belt made of elastomeric material, which is sufficiently strong to enable relatively high shear stresses to be absorbed, in particular when the tracked vehicle climbs very steep paths. Under these operating conditions, the belt teeth are particularly stressed and the construction of toothed belts suitable for the purpose, and at the same time reliable and durable, is relatively complex and expensive.

SUMMARY

The object of the present disclosure is to provide a technical solution to mitigate certain of the drawbacks of certain of the prior art.

In accordance with the present disclosure, there is provided a driving wheel configured to move a track of a tracked vehicle, the driving wheel comprising a rim configured to be connected to an actuator and extending about a rotation axis; a cylindrical surface configured to support and return a guide belt of the track; and a plurality of teeth integral with the rim configured to transmit the driving force to track-guides mounted on the cross-links of the track.

In accordance with the present disclosure, the guide belt is returned along a circular path and the driving motion is transmitted from the teeth to the cross-links of the track. The cylindrical surface enables the guide belt to be driven along a semicircular path and prevents the guide belt from winding along a polygonal path, and at the same time allows any shocks transmitted from the teeth to the cross-links to be absorbed.

In particular, the driving wheel comprises a ring, which defines the said cylindrical surface and is coupled to the rim in a rotatable manner about the axis of rotation.

In practice, the driving wheel transmits the driving force directly to the cross-links, which engage with the driving wheel and, in turn, transmit the driving force to the belts, which, in turn, transmit the driving force to other cross-links that do not engage the driving wheel. The ring placed in contact with the guide belt is not able to transmit the driving force to the guide belt because the ring in contact with the guide belt can rotate in an idle manner with respect to the rim of the driving wheel. In this way, any difference in speed between the driving wheel and the guide belt does not generate tension in the guide belt.

In greater detail, the rim comprises an outer face; said ring being arranged along the outer face so as to facilitate assembly.

In particular, the driving wheel comprises a bearing interposed between the rim and the ring in order to facilitate the rotation of the ring relative to the rim.

In particular, the ring is made of a material with a low coefficient of friction and is placed in contact with the rim; in particular, the ring comprises an annular groove, and the rim comprises an annular rib slidingly engaging the annular groove of the ring.

This is a particularly relatively economical solution because it is not necessary to use a bearing.

In particular, in some embodiments, the cylindrical surface is a friction surface in order to prevent slippage between the guide belt and the cylindrical surface.

In particular, the teeth are mounted on one side wall of the rim and are spaced apart from the cylindrical surface by a designated or given distance in a direction parallel to the axis of rotation so as to provide a space to enable the passage of projecting parts of the track, such as for example the track-guides.

In accordance with one embodiment of the present disclosure, the teeth are radial teeth with a gear tooth profile and are configured to engage the track-guides.

In accordance with one embodiment of the present disclosure, the teeth are cylinder-shaped axial teeth configured to engage the projecting parts of the track-guides.

In particular, the driving wheel comprises two rows of teeth arranged on opposite sides of the cylindrical surface, in particular the two rows of teeth are equally spaced from the cylindrical surface to distribute the transmission of the driving force symmetrically with respect to the guide surface.

A further object of the present disclosure is to provide a driving system, which is free from certain of the drawbacks of certain of the prior art.

In accordance with the present disclosure, there is provided a driving system of a tracked vehicle, in particular a snow groomer, the system comprising a driving wheel of the previously described type; and a track, which comprises a guide belt made of a reinforced elastomeric material; a plurality of cross-links, which are fixed to the guide belt and extend transversely to the guide belt; and a plurality of track-guides, wherein the guide belt is configured to contact the cylindrical surface of the driving wheel; and each track-guide is fixed to a respective cross-link and configured to engage with the teeth of the driving wheel.

The guide belt is advanced by the track-guides and the cross-links and guided by the driving wheel. The guide belt has the function of damping the transmission of vibrations between the cross-links and the driving wheel.

In particular, the guide belt has a width greater than the width of the cylindrical surface of the driving wheel.

In particular, the guide belt is toothed along the inner face configured to contact the cylindrical surface of the driving wheel, the teeth of the guide belt being integral with the guide belt or applied to the guide belt.

The teeth of the guide belt serve the purpose of increasing the deformation capacity of the guide belt and its ability to absorb shocks, and enable part of the track-guide to be housed in the interdental spaces.

In particular, each track-guide comprises two members arranged on opposite sides of the guide belt so as not to interfere with the cylindrical surface.

Additional features are described in, and will be apparent from the following Detailed Description and the figures.

BRIEF DESCRIPTION OF THE DRAWINGS

Further features and advantages of the present disclosure will be apparent from the following description of non-limiting embodiments thereof, with reference to the attached figures, wherein.

DETAILED DESCRIPTION

Figure 1:
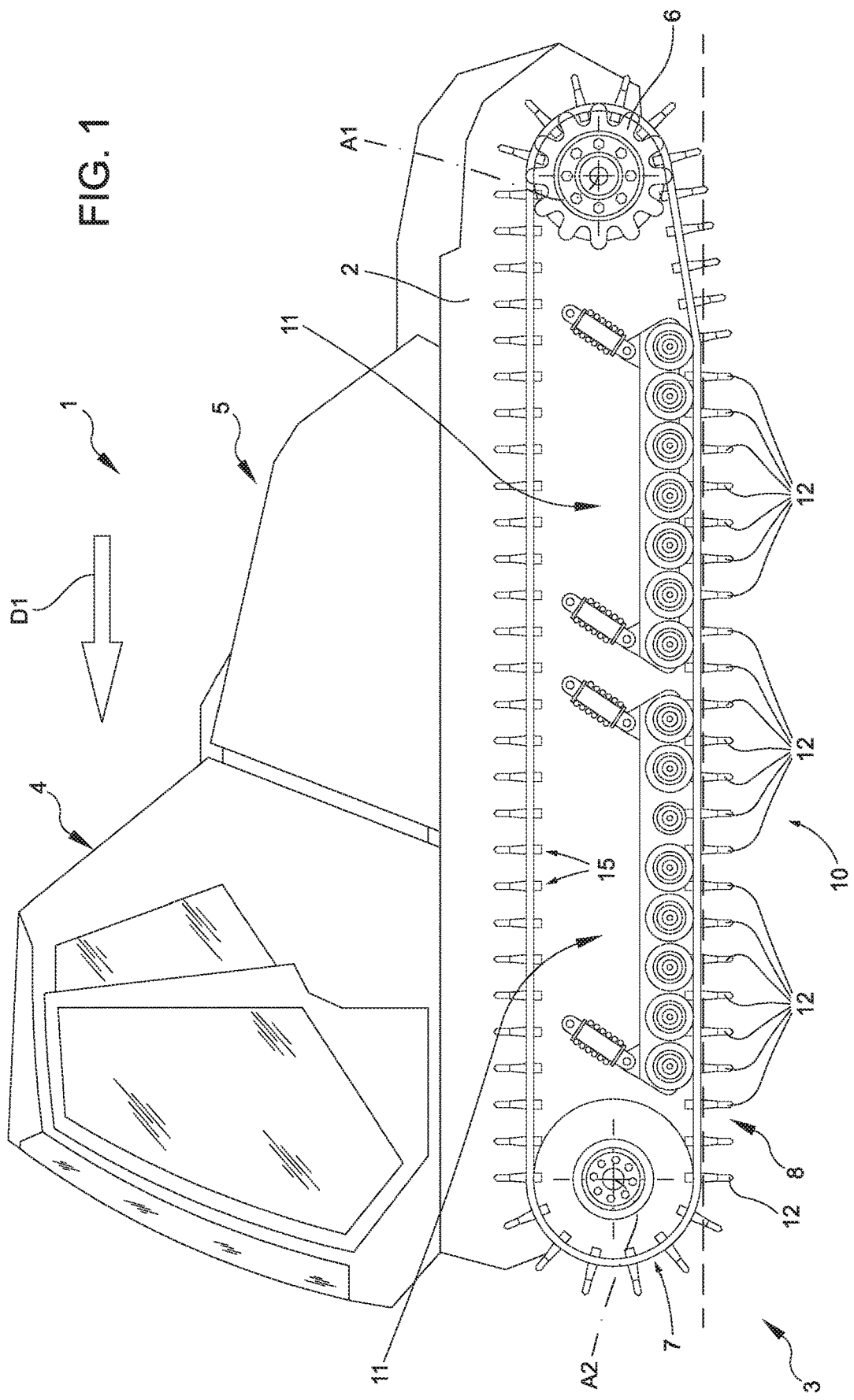
FIG. 1 is a side elevational view, with parts removed for clarity, of a tracked vehicle provided with a driving system constructed in accordance with the present disclosure.

With reference to FIG. 1, reference numeral 1 indicates, as a whole, a tracked vehicle for the preparation of ski slopes and configured to be advanced in a direction of travel D1. The tracked vehicle 1 comprises a chassis 2; two driving systems 3 (only one shown in FIG. 1); a cabin 4; and an engine 5. Each driving system 3 comprises one driving wheel 6; one idle wheel 7; and a track 8 wound around the driving wheel 6 and the idle wheel 7.

Each driving wheel 6 corresponds to the rear wheel of the tracked vehicle 1, is rotatable about an axis of rotation A1 and, in certain embodiments, is actuated by a hydraulic or electric actuator 9 (FIG. 2) forming part of the driving system 3.

Each idle wheel 7 corresponds to the front wheel of the tracked vehicle 1, is rotatable about an axis of rotation A2 parallel to the axis of rotation A1, and is supported by the chassis 2 in a selectively movable manner in a direction parallel to the direction of travel D1 in both directions to provide the track 8 with the appropriate tension in any operating condition.

The track 8 comprises an upper portion and a lower portion along which a driving portion 10 extends, which, in use, is placed in contact with the ground to discharge the mass of the tracked vehicle 1 and the driving force transmitted by the engine 5 to the ground through a kinematic chain up to the driving wheels 6.

Each driving system 3 comprises at least one support device 11, which has the function of discharging part of the mass of the tracked vehicle 1 onto the respective track 8 and compressing the driving portion 10 on the ground. In the case shown, each driving system 3 comprises two support devices 11 aligned with each other in direction D1 and arranged between the driving wheel 6 and the idle wheel 7.

In general, the support devices may have different configurations from those shown.

Each track 8 comprises a plurality of cross-links 12; a plurality of belts 13 and 14 (FIG. 2), which are made of a reinforced elastomeric material, are closed in a loop and are fixed to the cross-links 12; and a plurality of track-guides 15. Each track-guide 15 has the function of preventing the track 8 from shifting with respect to the driving wheel 6 and the idle wheel 7; fixing the respective cross-link 12 to the guide belt 14; and cooperating with the driving wheel 6 to transfer the driving force from the driving wheel 6 to the track 8.

Figure 2:
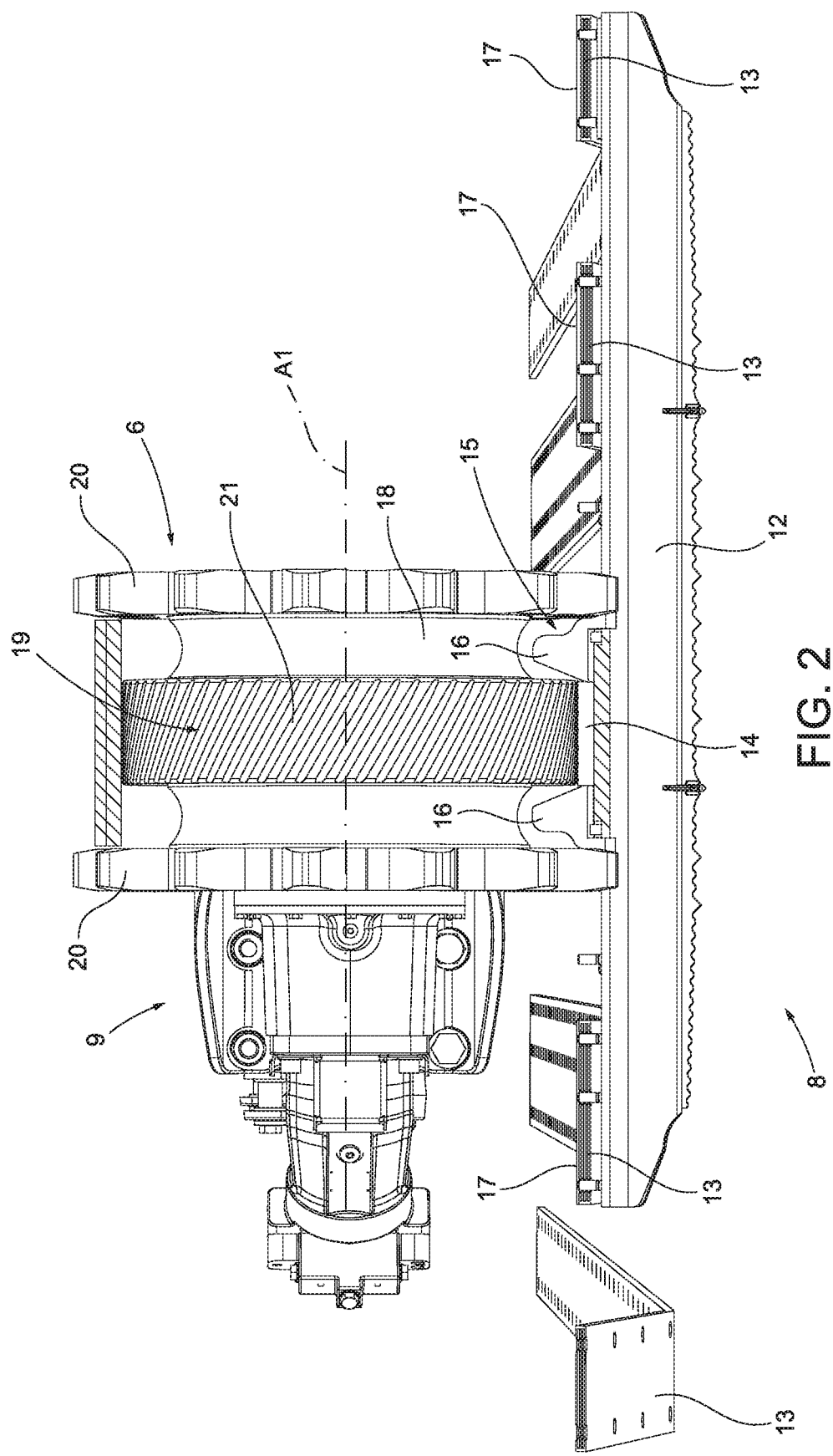
FIG. 2 is a rear view in enlarged scale, with parts removed for clarity and parts in section, of a detail of FIG. 1 including a driving wheel.

With reference to FIG. 2, the cross-links 12 can have a width less than the width of the track 8 and connect only some of the belts 13 and 14. In order to connect all the belts 13 and 14, the cross-links 12 are staggered. Each track-guide 15 comprises two opposite members 16 spaced apart from one another and mounted in a mirror-like manner on a same cross-link 12. Each member 16 comprises a fastening portion configured to connect the member 16 to the cross-link 12 by screws and bolts; and a guide portion which extends over the guide belt 14 and towards the driving wheel 6 to tighten the guide belt 14 on the cross-link 12 and guide the track 8 with respect to the driving wheel 6.

The guide belt 14 is configured to cooperate with the driving wheel 6, the idle wheel 7 and the support devices 11 (FIG. 1). In this case, the guide belt 14 is arranged in a central position and is toothed along the inner face. The toothing can be integrally formed during the process for manufacturing the guide belt 14 or applied subsequently. The guide portion of the member 16 is partially arranged in the space between two successive teeth of the guide belt 14 and contacts the driving wheel 6 during any movement of the track 8 relative to the driving wheel 6 parallel to the axis of rotation A1.

The belts 13 are arranged on opposite sides of the guide belt 14 and have the sole function of connecting the cross-links 12 to each other. Each cross-link 12 is connected to the belts 13 by plates 17 bolted to the cross-links 12. In practice, the plates 17 are fixed to the cross-links 11 so as to close part of the belts 13 like a sandwich.

Each driving wheel 6 comprises a rim 18, which is configured to be connected to the actuator 9 and extends about the rotation axis A1; a cylindrical surface 19 for supporting and returning the guide belt 14; and a plurality of teeth 20 integral with the rim 18 for transmitting the driving force to the track-guides 15 mounted on the cross-links 12 of the track 8. In the case shown, the driving wheel 6 comprises a ring 21, which defines the cylindrical surface 19 and is coupled to the rim 18 in a rotatable manner about the axis of rotation A1. In greater detail and with reference to FIG. 3, the rim 18 comprises an outer face 22, along which the ring 21 is mounted in a position equidistant from the two edges of the rim 18. In particular, the ring 21 is mounted on the rim 18 by interposing a bearing 23.

The cylindrical surface 19 is a friction surface configured to engage the guide belt 14. In particular, the cylindrical surface 19 is knurled and/or made of rubber.

The teeth 20 are mounted at the side edges of the rim 18 to form two rows of teeth 20 or sprockets and are spaced apart from the cylindrical surface 19 by a designated or given distance.

In the case shown, the teeth 20 are radial teeth with a gear tooth profile and, in use, are cyclically placed in contact with the fastening portion of a member 16 of the track-guide 15, while the guide belt 14 is in contact with the cylindrical surface 19. In practice, the driving force transmission function occurs between the teeth 20 and the cross-links 12 with the interposition of the track-guide 15, whereas the support function of the track 8 is carried out by the coupling between the guide belt 14 and the ring 21.

Figure 3:
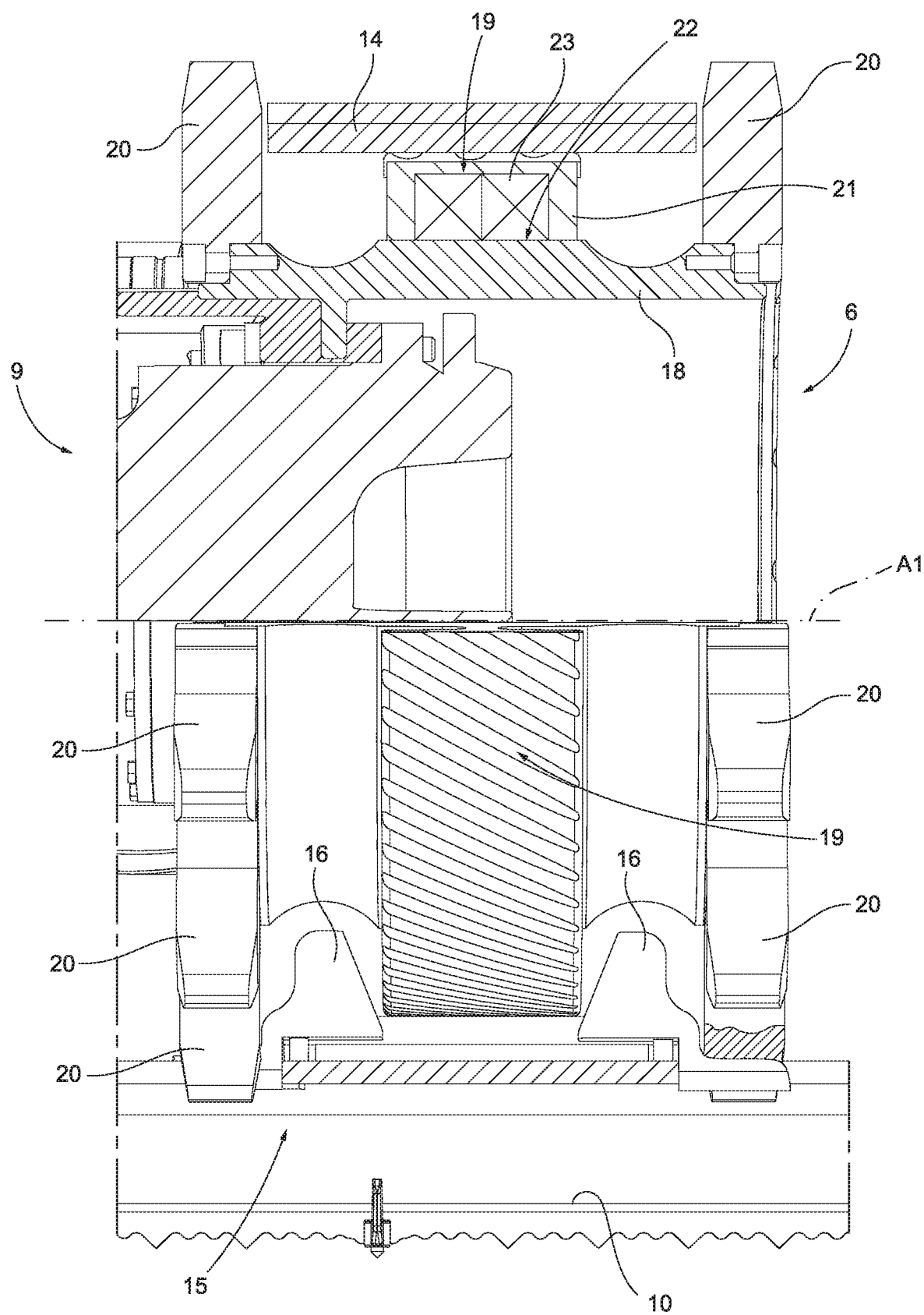
FIG. 3 is an elevational view in further enlarged scale, with parts removed for clarity and parts in section, of the driving wheel shown in FIG. 2.
Figure 4:
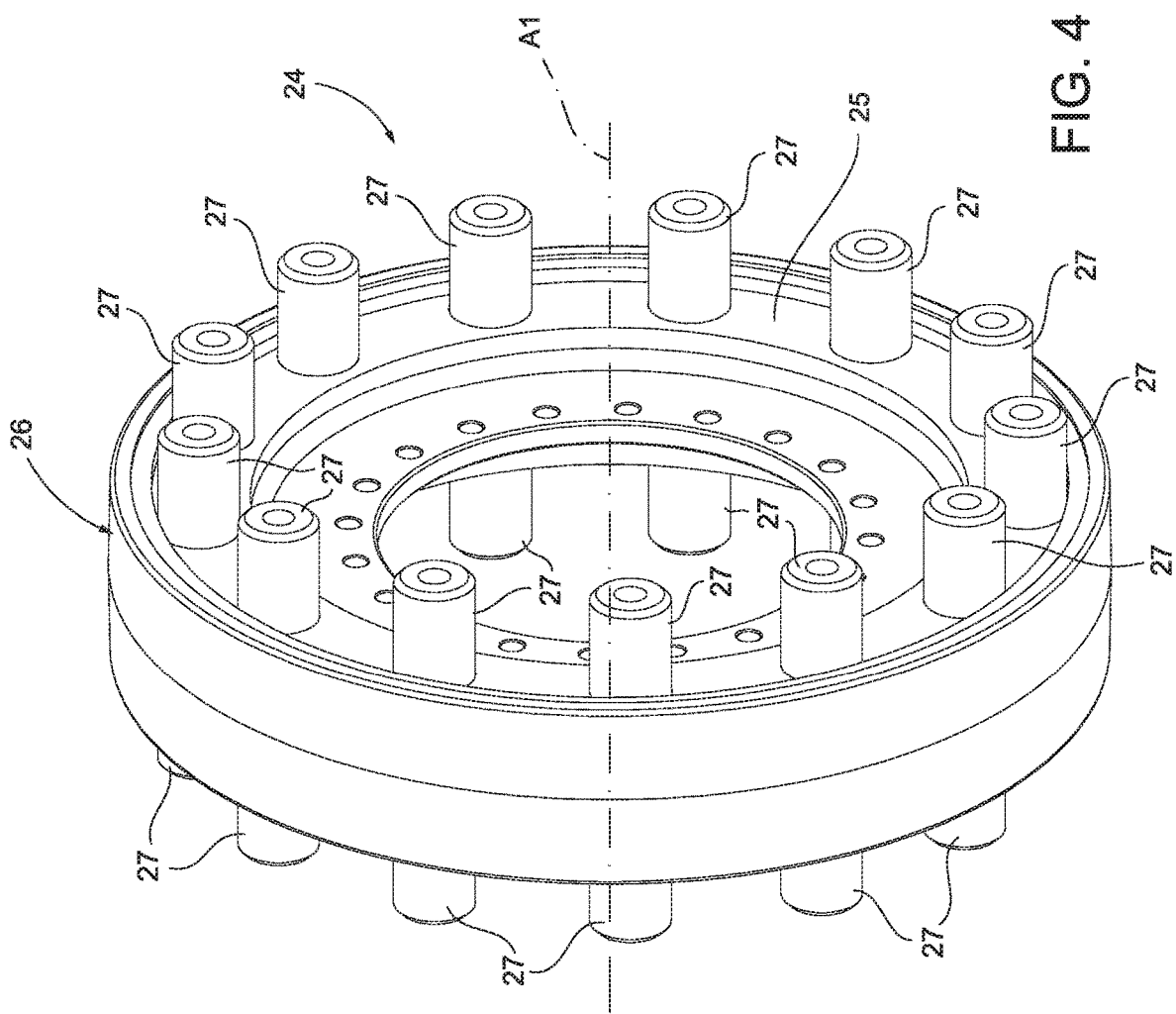
FIG. 4 is a perspective view, with parts removed for clarity, of a variant of the driving wheel.

With reference to FIG. 4, reference numeral 24 indicates a variant of the driving wheel 6 (FIG. 2). The driving wheel 24 comprises a rim 25, which is configured to be connected to the actuator 9 (FIG. 2) and extends about the rotation axis A1; a cylindrical surface 26 for supporting and returning the guide belt 14 (FIG. 3); and a plurality of teeth 27 integral with the rim 25 for transmitting the driving force to the track-guides 15 (FIG. 3).

In the example shown, the cylindrical surface 26 defines the outer face of the rim 25, and the wheel 24 is devoid of a ring rotatable relative to the rim 25.

The teeth 27 are mounted on the rim 25 and extend parallel to the axis of rotation A1 and protrude laterally with respect to the cylindrical surface 26.

In the illustrated embodiment, the driving wheel 24 has no ring rotatably mounted with respect to the rim about the axis A1, and the cylindrical surface must be particularly smooth so as to enable slippage between the guide belt 14 (FIG. 2) and the rim 25. Unlike the driving wheel 6 (FIGS. 2 and 3), the driving wheel 24 transmits the driving force to the projecting part of the members 16 of the track-guides 15 and is relatively easier to manufacture than the driving wheel 6.

Figure 5:
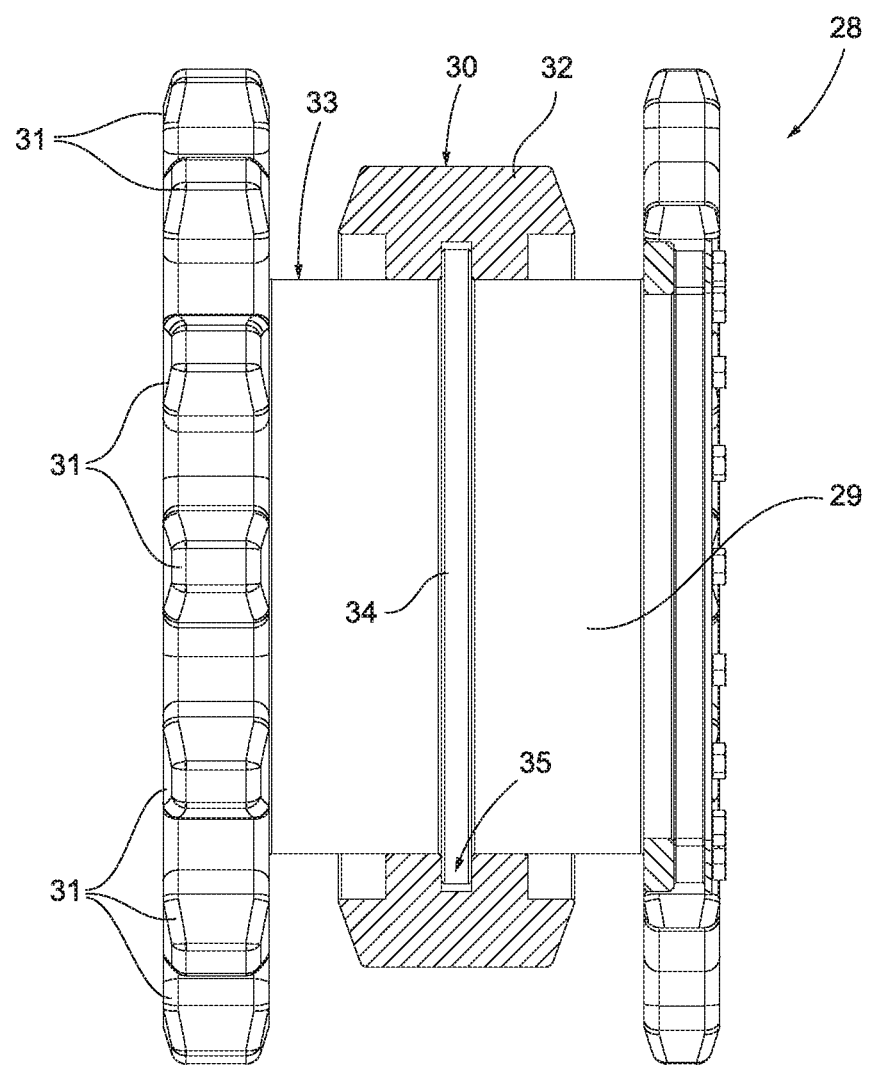
FIG. 5 is an elevational view, with parts removed for clarity and parts in section, of the driving wheel shown in FIG. 2.

With reference to FIG. 5, reference numeral 28 indicates a variant of the driving wheel 6 (FIG. 2). The driving wheel 28 comprises a rim 29, which is configured to be connected to the actuator 9 (FIG. 2) and extends about the rotation axis A1; a cylindrical surface 30 for supporting and returning the guide belt 14 (FIG. 3); and a plurality of teeth 31 integral with the rim 29 for transmitting the driving force to the track-guides 15 (FIG. 3).

In the case shown, the driving wheel 28 comprises a ring 32, which defines the cylindrical surface 30 and is coupled to the rim 29 in a rotatable manner about the axis of rotation A1. In greater detail, the rim 18 comprises an outer face 33, along which an annular rib 34 extends, which acts as a guide for the ring 32 and prevents lateral sliding of the ring 32 with respect to the rim 29 along the axis A1. The ring 32 comprises an annular groove 35 housing the annular rib 34.

The ring 32 is made of a material with a low coefficient of friction and it is not necessary to interpose a bearing between the rim 29 and the ring 32. Moreover, the ring 32 is made of at least two parts, and in this case comprises two half rings axially joined to one another.

Figure 6:
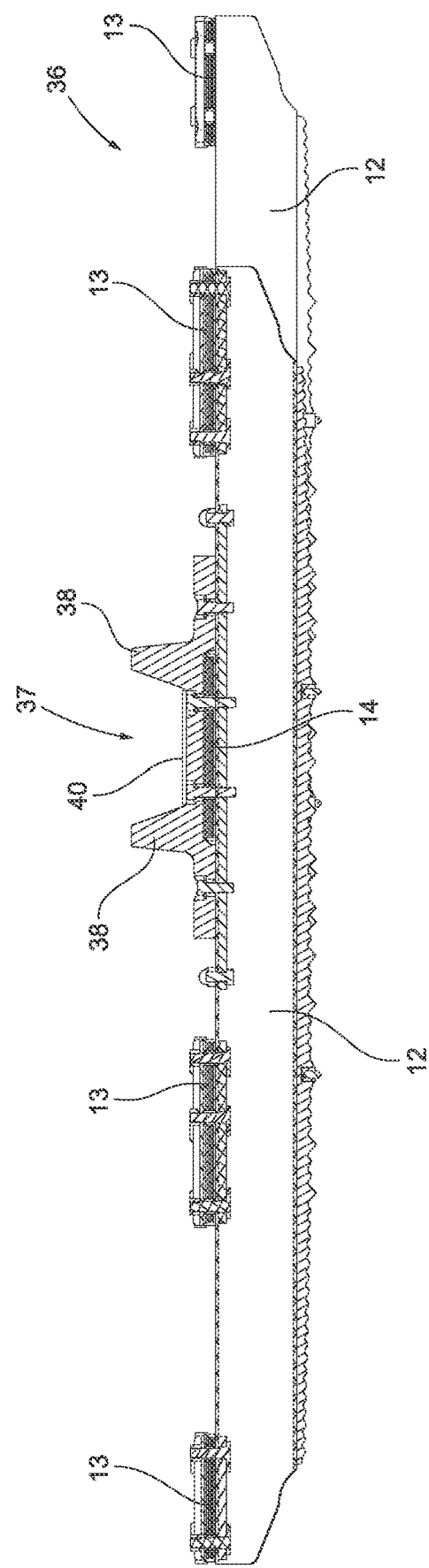
FIG. 6 is a sectional view, with parts removed for clarity, of a variant of the track shown in FIG. 2.

With reference to FIG. 6, reference numeral 36 indicates a variant of the track 8 (FIG. 2). The track 36 differs from the track 6 (FIG. 2) in that track 36 comprises a track-guide 37 with two projecting parts 38 made in one piece; and a guide belt 39, which is clamped between the cross-link 12 and the track-guide 37 and substantially has bearings 40 which form a set of teeth along the inner face of the guide belt 39. In certain embodiments, the bearings 40 are applied to the guide belt 39 by vulcanization and have the function of defining interdental spaces in which to house part of the track-guides 37.

The various types of wheels disclosed in the present description can cooperate with both of the tracks described.

Lastly, it is clear that modifications and variations may be made to the disclosure described herein without departing from the scope of the appended claims. As such, the present disclosure also covers embodiments not described in the detailed description and equivalent embodiments that fall within scope of the appended claims. Accordingly, various changes and modifications to the presently disclosed embodiments will be apparent to those skilled in the art.

The invention claimed is:

1. A tracked vehicle driving system comprising:
    a track comprising a plurality of belts including a guide belt made of a reinforced elastomeric material;
    a plurality of cross-links fixed to the guide belt and extending transversely to the guide belt;
    a plurality of track-guides, wherein each track-guide is fixed to a respective cross-link; and
    a driving wheel comprising:
        a rim connected to an actuator and extending about an axis of rotation;
        a ring defining a cylindrical surface supporting and returning the guide belt of the track, the ring configured to be freely rotatably coupled to the rim about the axis of rotation; and
        a plurality of teeth integral with the rim, the plurality of teeth comprising two rows of radial teeth equally spaced apart from opposite sides of the cylindrical surface, the plurality of teeth configured to transmit a driving force to the plurality of track-guides.

2. The tracked vehicle driving system of claim 1, wherein the rim of the driving wheel defines an outer face and the ring is arranged along the outer face.

3. The tracked vehicle driving system of claim 1, wherein the driving wheel further comprises a bearing interposed between the rim of the driving wheel and the ring of the driving wheel.

4. The tracked vehicle driving system of claim 1, wherein the ring of the driving wheel is made of a material with a low coefficient of friction and is in contact with the rim of the driving wheel.

5. The tracked vehicle driving system of claim 1, wherein the ring of the driving wheel defines an annular groove and the rim of the driving wheel comprises an annular rib slidingly positioned in the annular groove of the ring of the driving wheel.

6. The tracked vehicle driving system of claim 1, wherein the teeth of the driving wheel are spaced apart from the cylindrical surface defined by the ring of the driving wheel by a designated distance in a direction parallel to the axis of rotation.

7. The tracked vehicle driving system of claim 1, wherein the guide belt has a width greater than a width of the cylindrical surface defined by the ring of the driving wheel.

8. The tracked vehicle driving system of claim 1, wherein the guide belt is toothed along an inner face configured to contact the cylindrical surface defined by the ring of the driving wheel and the teeth of the guide belt are at least one of integral with the guide belt and applied to the guide belt.

9. The tracked vehicle driving system of claim 1, wherein each track-guide comprises two members arranged on opposite sides of the guide belt.

10. The tracked vehicle driving system of claim 1, wherein the track comprises a track of a snow groomer.

11. A snow groomer comprising:
a first driving system comprising:
  a first track comprising a first plurality of belts including a first guide belt made of a reinforced elastomeric material;
  a plurality of first cross-links fixed to the first guide belt and extending transversely to the first guide belt;
  a plurality of first track-guides, wherein each first track-guide is fixed to a respective cross-link of the plurality of first cross-links; and
  a first driving wheel comprising:
    a first rim connected to a first actuator and extending about a first axis of rotation;
    a first ring defining a first cylindrical surface supporting and returning the first guide belt of the first track, the first ring configured to be freely rotatably coupled to the first rim about the first axis of rotation; and
    a plurality of first teeth integral with the first rim, the plurality of first teeth comprising two rows of first teeth equally spaced apart from opposite sides of the first cylindrical surface, the plurality of first teeth configured to transmit a first driving force to the plurality of first track-guides; and
a second driving system comprising:
  a second track comprising a second plurality of belts including a second guide belt made of the reinforced elastomeric material;
  a plurality of second cross-links fixed to the second guide belt and extending transversely to the second guide belt;
  a plurality of second track-guides, wherein each second track-guide is fixed to a respective cross-link of the plurality of second cross-links; and
  a second driving wheel comprising:
    a second rim connected to a second actuator and extending about a second axis of rotation;
    a second ring defining a second cylindrical surface supporting and returning the second guide belt of the second track, the second ring configured to be freely rotatably coupled to the second rim about the second axis of rotation; and
    a plurality of second teeth integral with the second rim, the plurality of second teeth comprising two rows of second teeth equally spaced apart from opposite sides of the second cylindrical surface, the plurality of second teeth configured to transmit a second driving force to the plurality of second track-guides.

12. A tracked vehicle driving system comprising:
a track comprising a plurality of belts including a guide belt made of a reinforced elastomeric material;
a plurality of cross-links fixed to the guide belt and extending transversely to the guide belt;
a plurality of track-guides, wherein each track-guide is fixed to a respective cross-link; and
a driving wheel comprising:
  a rim connected to an actuator and extending about an axis of rotation;
  a ring defining a cylindrical surface supporting and returning the guide belt of the track, the ring configured to be freely rotatably coupled to the rim about the axis of rotation; and
  a plurality of teeth integral with the rim, the plurality of teeth comprising two rows of horizontal teeth equally spaced apart from opposite sides of the cylindrical surface, the plurality of teeth configured to transmit a driving force to the plurality of track-guides.

13. The tracked vehicle driving system of claim 12, wherein the guide belt has a width greater than a width of the cylindrical surface defined by the ring of the driving wheel.

14. The tracked vehicle driving system of claim 12, wherein the guide belt is toothed along an inner face configured to contact the cylindrical surface defined by the ring of the driving wheel and the teeth of the guide belt are at least one of integral with the guide belt and applied to the guide belt.

15. The tracked vehicle driving system of claim 12, wherein each track-guide comprises two members arranged on opposite sides of the guide belt.

16. The tracked vehicle driving system of claim 12, wherein the track comprises a track of a snow groomer.

17. The tracked vehicle driving system of claim 12, wherein the rim of the driving wheel of the driving wheel defines an outer face and the ring of the driving wheel is arranged along the outer face.

18. The tracked vehicle driving system of claim 12, wherein the driving wheel further comprises a bearing interposed between the rim of the driving wheel and the ring of the driving wheel.

19. The tracked vehicle driving system of claim 12, wherein the ring of the driving wheel is made of a material with a low coefficient of friction and is in contact with the rim.

20. The tracked vehicle driving system of claim 12, wherein the ring of the driving wheel defines an annular groove and the rim of the driving wheel comprises an annular rib slidingly positioned in the annular groove of the ring of the driving wheel.

21. The tracked vehicle driving system of claim 12, wherein the teeth of the driving wheel are spaced apart from the cylindrical surface defined by the ring of the driving wheel by a designated distance in a direction parallel to the axis of rotation.

* * * * *